L. G. MERRELL.
Pill Machine.
No. 10,431.
2 Sheets—Sheet 1.
Patented Jan'y 17, 1854.
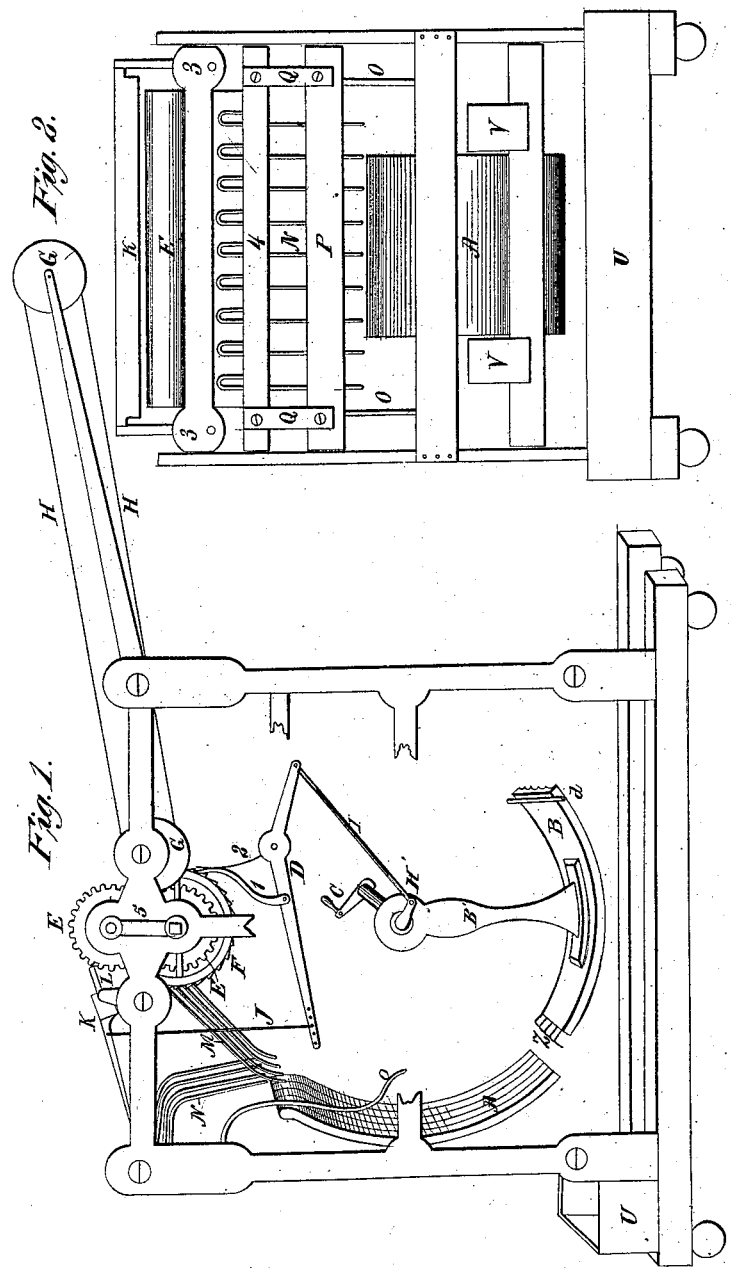
Inventor:
Loriston G. Merrill.

L. G. MERRELL.
Pill Machine.
No. 10,431.
2 Sheets—Sheet 2.
Patented Jan'y 17, 1854.
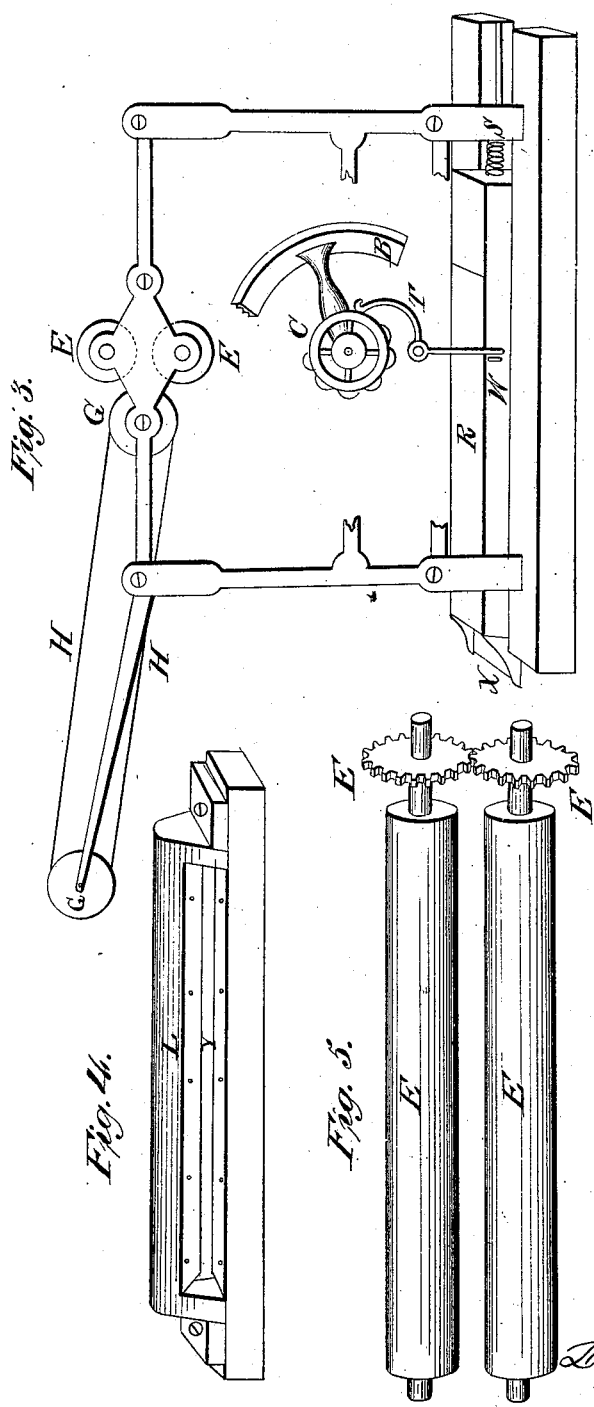
Inventor:
Loriston G. Merrill.

UNITED STATES PATENT OFFICE.

LORISTON G. MERRELL, OF NEW BEDFORD, PENNSYLVANIA.

IMPROVEMENT IN PILL-MACHINES.

Specification forming part of Letters No. 10,431, dated January 17, 1854.

*To all whom it may concern:*

Be it known that I, LORISTON G. MERRELL, of New Bedford, in the county of Lawrence and State of Pennsylvania, have invented a new and useful Machine for the Purpose of Making Pills; and I do hereby declare that the following is a full and exact description thereof, reference being had to the accompanying drawings and letters of reference marked thereon.

The nature of my invention consists in constructing a machine which will roll the pill mass in a thin sheet, cut it into worms, and then roll it into pills, afterward coating them with sugar or any other substance which may be desired.

To enable others to understand and make use of my machine, I will describe its construction and operation.

Figure 1 is a side view of my machine with a part of the frame broken off, to better show the arrangement of the machinery.

A is a concave with grooves running lengthwise on its concave surface, parallel with each other and of a size necessary to form the sized pill required.

B is a semicircle or segment of a circle with grooves on its convex surface corresponding to the grooves in the concave. This segment is hung by an arm, B', on a shaft with a crank, C', and so adjusted with respect to the concave that the edges of the grooves of the segment and concave shall nearly touch when the segment is made to revolve by turning the crank C'.

H' is a short crank on the end of the shaft C.

I is a connector attached at one end to the crank H' and at the other end to the short end of the lever D.

1 is a dog or catch attached to the long end of the lever D, working in the ratchet-wheel F, which is attached to the lower one of the two rollers shown, E E, Fig. 5, and pressed into ratchets by means of the spring 2.

J is a connector attached to the long end of the lever D and to the knife K, which knife K is attached to the roller 3 3, Fig. 2, which is an end view of my machine.

L is a gage-block. (See Fig. 4.)

M, Fig. 1, are fingers attached to the gage-block L. N are also wire fingers attached to the roller 4, Fig. 2, which roller is fastened by the two springs Q Q to the cross-bar P.

O O are two wire arms, crooked as seen at O, Fig. 1, and attached to the roller 4, Fig. 2.

H H is a feed-band passing around the pulleys or rollers G G.

My machine works as follows, to wit: The pill mass, which has previously been mixed to the consistency of stiff dough, is placed upon the feed-band H H, and passes between the two rollers E E, which roll it out the required thickness. On turning the crank C' the crank H' revolves also, moving the short end of the lever D up and down, consequently the long end up and down at every revolution of said crank. This movement of the lever D works the ratchet-wheel F by means of the dog 1, and this ratchet-wheel is fastened to one end of the lower roller E. This roller communicates motion to the other roller E by means of the two cogged wheels E' E'. The revolution of these rollers draws the pill mass through between them, and as it passes through it is cut into long pill worms by the knife K, which knife makes one stroke at every revolution of the crank H'. The pill worm then falls down on the fingers M, and rolls down against the fingers N, and there remains until the segment B passes around, and the cross-bar *a* strikes the crooked wire arm O, moving it back, which moves the fingers N back, letting the worm drop between the concave and segment, when it is cut and rolled into pills by the groove in said concave and segment, the wire hooks Z cleaning the concave after the passage of the segment. The end of the worms which may project beyond the width of the concave A are caught by the two tin plates V V, and fall into the trough U, when they may be collected and reworked. The concave and segment may be removed, and others put in their places for different-sized pills. When the pills are rolled, they fall into the coating-box R, Fig. 3, which coating-box has one or more screens on the inside, arranged so that the pills shall roll back and forward two or more times, as may be required, before they are discharged at the spout X. This coating-box R is made to move back and forward by means of the wheel C, with circular cogs on one of the sides, placed on the same shaft with the segment B, and revolving with it, thereby operating the crooked lever T, which pushes the box R toward X by means of the pin W, and as the cogs pass the end of the lever T the box R is drawn back toward S by the spiral spring S, by this movement shaking the pills in the box in such a manner as to coat them with sugar or any desired substance.

The rollers E E, Fig. 1, are so arranged by a slot and moving box, 5, as to be separated or brought nearer together for the purpose of rolling the pill mass to any desired thickness.

What I claim as my invention, and desire to secure by Letters Patent of the United States, is the combination of machinery described in my specification as follows, to wit:

1. The revolving segment with the arrangement of lever and ratchet attached, moving the knife in the manner described.

2. The peculiar operation of the fingers which support the pill worm until the proper time for dropping it between the segment and concave, with the coating-box attached and moved as aforesaid, or any other arrangement of machinery substantially the same, and which will produce the intended effect.

LORISTON G. MERRELL.

Witnesses:
A. B. RICHMOND,
I. DOUGLASS, Jr.